United States Patent Office 2,845,426
Patented July 29, 1958

2,845,426

VITAMIN B₁ DERIVATIVES

Fritz Ziegler, Wuppertal-Elberfeld, Germany, assignor to Schenley Industries, Inc., New York, N. Y., a corporation of Delaware No Drawing. Application March 12, 1956
Serial No. 570,714

Claims priority, application Germany March 25, 1955

13 Claims. (Cl. 260—256.6)

This invention relates in general to novel chemical compounds and to a new and improved process for preparing the same. More particularly, the invention contemplates the provision of new difficultly soluble crystalline salts of vitamin $B_1$ which may be designated as reaction products of salts of this vitamin with certain hydroxybenzoic acid derivatives, such as derivatives of salicylic acid carrying aliphatic or aromatic substituents within the benzene nucleus.

In contrast to the general class of difficultly soluble salts of thiamin known heretofore, the compounds of the invention contain as acid components derivatives of salicylic acid. It is now well established that both thiamin and salicylic acid possess remarkable antineuralgic and antirheumatic activity although each functions on a different principle; the former acting within the oxidation-reduction processes of the human body concerned in the utilization of carbohydrate to correct disturbances in carbohydrate metabolism and nerve function, and the latter through its analgesic action within the central nervous system. The compounds of the invention may be employed with particular advantage for antirheumatic and antineuralgic applications by reason of the fact that both components of the novel salts are active for this purpose and exhibit synergy, or synergistic physiological activity, within the crystalline products of the invention.

The compounds also possess utility for use in the recovery and purification of vitamin $B_1$ from crude solutions or from molten liquors of crystallization, or, they may be employed in the preparation of vitamin compositions of protracted activity and prolonged storage stability even in moist media, by reason of their favorable solubility characteristics for these purposes. Of course, it is expected that the products of the invention will also find utility in the conventional applications for known difficultly soluble salts of thiamin, such, for example, as additives or enriching agents for flour and other foodstuffs, and in particular, foodstuffs of the type which are prepared by cooking in water wherein the relatively water-soluble, labile salts of thiamin tend to lose their physiological activity.

The new difficultly soluble crystalline salts of vitamin $B_1$ may be formed by reacting in aqueous solution, salts of vitamin $B_1$ with salts of certain derivatives of hydroxybenzoic acid as defined hereinafter. In order to avoid partial precipitation of free acids which are difficultly soluble in water when strongly acid salts of thiamin such as thiamin chloride hydrochloride are employed as starting materials in the process of the invention, I have found it to be advantageous to effect the reaction between salts at pH values within the range of pH 5.0 to 7.0, and preferably at pH 6.0. This may be accomplished quite readily by adjusting the respective solutions of both components to the desired pH value before they are reacted.

The acids which have been found to be capable of forming the difficultly soluble, crystallized salts of vitamin $B_1$ in accordance with the invention may be represented as a class by the following general formula:

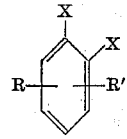

wherein X represents a carboxyl group in one position and a hydroxy group in the remaining position; R represents an aliphatic or aromatic hydrocarbon substituent including bicyclic fused or condensed aromatic substitution as in the homologous salicylic acid type derivatives of the naphthalene series; and R' represents hydrogen or methyl. In particular, the following acids among others of similar structural characteristics have been found to be effective in preparing the difficultly soluble compounds of the invention:

| Acid | Source |
|---|---|
| (1) 5-isobutyl-2-hydroxybenzoic acid; (5-isobutyl-salicylic acid) $$\underset{H_3C}{\overset{H_3C}{>}}CH-CH_2-\underset{}{\overset{COOH}{\underset{OH}{\bigcirc}}}$$ | Prepared by carboxylation of the corresponding phenol (J. Org. Chem. 19, 510, 1954). |
| (2) 5-isohyxyl-2-hydroxybenzoic acid; (5-isohexyl-salicylic acid) $$\underset{H_3C}{\overset{H_3C}{>}}CH-(CH_2)_2-CH_2-\underset{}{\overset{COOH}{\underset{OH}{\bigcirc}}}$$ | Same. |
| (3) 5-isoheptyl-2-hydroxybenzoic acid; (5-isoheptyl-salicylic acid) $$\underset{H_3C}{\overset{H_3C}{>}}CH-(CH_2)_3-CH_2-\underset{}{\overset{COOH}{\underset{OH}{\bigcirc}}}$$ | Preparation by carboxylation of the corresponding phenol (J. Org. Chem. 19, 510, 1954). |
| (4) 5-isooctyl-2-hydroxybenzoic acid; (5-isooctyl-salicylic acid) $$\underset{H_3C}{\overset{H_3C}{>}}CH-(CH_2)_4-CH_2-\underset{}{\overset{COOH}{\underset{OH}{\bigcirc}}}$$ | Same. |
| (5) 5-cyclohexyl-2-hydroxybenzoic acid; (5-cyclohexyl-salicylic acid) | U. S. Patent No. 1,998,750. |
| (6) 4-isopropyl-3-methyl-2-hydroxybenzoic acid; (isothymotinic acid) | Prepared by carboxylation of isothymol by the method of J. Org. Chem., supra. |

| Acid | Source |
|---|---|
| (7) 5 - isobutyl - 3 - methyl - 2 - hydroxybenzoic acid; (isobutyl - o - cresotinic acid) | Prepared from 4-isobutyl-2-methyl phenol by carboxylation, i. e., treating a mixture of the phenol and anhydrous potassium carbonate with carbonic acid under pressure and at an elevated temperature (German Patent No. 73,279; J. Org. Chem., supra). |
| (8) 5 - cyclohexyl - 3 - methyl - 2 - hydroxybenzoic acid; (cyclohexyl - o - cresotinic acid) | Same procedure as described above from 4-cyclohexyl-2-methyl phenol obtained by hydrolyzing 5-cyclohexyl-2-amino-1-methyl benzene. |
| (9) 3-phenyl-2-hydroxybenzoic acid; (diphenyl-2-hydroxy-3-carboxylic acid) | Beilstein, 10, 341. |
| (10) 5-phenyl-2-hydroxybenzoic acid; (diphenyl-4-hydroxy-3-carboxylic acid) | Same. |
| (11) 1-hydroxy-2-naphthoic acid; (1-naphthol-2-carboxylic acid) | Beilstein, 10, 331. |

Analytical investigation of the compounds of the invention indicates that the majority of the crystalline salts are obtained in a molar ratio of one mole of vitamin $B_1$ base to one mole of acid even when a large excess of acid is employed. In one instance, however, namely the thiamin salt of cyclohexyl salicylic acid (5 above), it was observed that the difficultly soluble crystalline salt contains two moles of acid for each mole of vitamin $B_1$ base. While the compounds are difficultly soluble in water, they are very readily soluble in methanol and ethanol, substantially soluble in acetone and dioxan, but insoluble in ligroin. They may be recrystallized readily without change in composition.

In their application to the recovery and purification of vitamin $B_1$, the compounds of the invention are superior to known difficultly soluble compounds of thiamin by reason of their unique overall solubility characteristics. Thus, it is possible to precipitate thiamin from a thiamin-containing mother liquor as one of the difficultly soluble salts of the invention, separate it from the solution and thereafter dissolve the salt in methanol, whereby thiamin chloride hydrochloride may be recovered in almost quantitative yields by acidifying the methanolic solution with hydrochloric acid and adding acetone. Alternatively, thiamin chloride hydrochloride may be recovered from the difficultly soluble salts of the invention by acidifying their methanolic solutions with aqueous hydrochloric acid, evaporating the methanol and separating the hydroxybenzoic acid component which is insoluble in the aqueous solution, and thereafter recovering thiamin chloride hydrochloride from the aqueous solution.

In order to facilitate a better understanding of the subject matter of the invention, specific examples follow in which the preparation of several of the compounds of the invention is described. It is understood that these examples are provided by way of illustration only and are not regarded as imposing any limitations upon the invention except as defined within the appended claims.

*Example 1*

Thiamin chloride hydrochloride, in amount 10.11 grams, was dissolved in 30 cubic centimeters of water. The solution was cooled with ice-water and sodium bicarbonate solution added with continued cooling and stirring until the pH value was adjusted at 6.0. A solution of isobutyl sodium salicylate was prepared by suspending 7 grams (slight excess) of isobutyl-salicylic acid (5-isobutyl-2-hydroxybenzoic acid) in 300 cubic centimeters of water and adding sodium hydroxide (20%) until the acid dissolved and the solution reached a pH of about 6.0. This solution was then added, by pouring, to the solution of thiamin chloride hydrochloride. By rubbing the wall of the reaction vessel with a glass rod, nuclei of crystallization were obtained in the clear supersaturated solution and the mixture was then left standing with continued cooling. Shortly, a thick crystal slurry was formed consisting of fine needles which were recovered after 2 hours by suction filtration, washed with ice-cold water, and then dried. The yield was 12 grams. The analysis of the recrystallized compound showed the composition to be one (1) mole of thiamin base and one (1) mole of isobutyl-salicylic acid (5-isobutyl-2-hydroxybenzoic acid).

In exactly the same manner described above, thiamin compounds of the following acids were prepared in yields of 80 to 95 percent of theoretical by employing in place of isobutyl sodium salicylate, the corresponding salts of these acids (in slight excess):

(1) 5-isohexyl-2-hydroxybenzoic acid;
(2) 5-isoheptyl-2-hydroxybenzoic acid;
(3) 5-isooctyl-2-hydroxybenzoic acid;
(4) 4-isopropyl-3-methyl-2-hydroxybenzoic acid;
(5) 3-phenyl-2-hydroxybenzoic acid;
(6) 5-isobutyl-3-methyl-2-hydroxybenzoic acid; and
(7) 1-hydroxy-2-napthoic acid.

All compounds thus prepared analyzed one mole of acid for each mole of thiamin base, whereas it was found that in preparing the thiamin salt of 5-cyclohexyl-2-hydroxybenzoic acid, as described in the following example, the proportion of acid employed must be higher in order to obtain good yields since the compound contains two (2) moles of acid for each mole of thiamin base.

*Example II*

Cyclohexyl-salicylic acid (5-cyclohexyl - 2 - hydroxybenzoic acid), in amount 15 grams, was suspended in 60 cubic centimeters of water, and thereafter the acid was dissolved by the addition of sodium hydroxide (20%) and the solution adjusted to pH 6.0–6.2. A thiamin solution, obtained by dissolving 10.11 grams of thiamin chloride hydrochloride in 20 cubic centimeters of water and carefully neutralizing the solution by the addition of sodium hydroxide (20%) with cooling and stirring to a pH of 6.0, was added to the solution of cyclohexyl-salicylic acid. After lightly rubbing the clear solution with a glass rod, needle-shaped crystals formed immediately and condensed to a thick precipitate upon standing for a short period. The precipitate was recovered by suction filtration after two (2) hours, washed with water, and then dried. The yield amounted to 18.5 grams. The analysis of the recrystallized compound showed the composition to be one (1) mole of thiamin base and two (2) moles of cyclohexyl-salicylic acid (5-cyclohexyl-2-hydroxybenzoic acid).

In exactly the same manner, the thiamin salts of the following acids were prepared, but these analyzed one (1) mole of acid for each mole of thiamin base:

(1) 5-cyclohexyl-3-methyl-2-hydroxybenzoic acid; and
(2) 5-phenyl-2-hydroxybenzoic acid.

I claim:

1. A chemical compound comprising a member of the group consisting of thiamin salts of substituted hydroxybenzoic acids of the formulation:

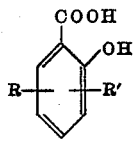

wherein R is a member selected from the group consisting of the aliphatic and aromatic radicals isopropyl, isobutyl, isohexyl, isoheptyl, isooctyl, cyclohexyl, phenyl and phenylene; and R' is a member selected from the group consisting of hydrogen and methyl.

2. The normal thiamin salt of 5-isobutyl-2-hydroxybenzoic acid.
3. The normal thiamin salt of 5-isohexyl-2-hydroxybenzoic acid.
4. The normal thiamin salt of 5-isoheptyl-2-hydroxybenzoic acid.
5. The normal thiamin salt of 5-isooctyl-2-hydroxybenzoic acid.
6. The normal thiamin salt of 5-cyclohexyl-2-hydroxybenzoic acid.
7. The normal thiamin salt of 4-isopropyl-3-methyl-2-hydroxybenzoic acid.
8. The normal thiamin salt of 5-isobutyl-3-methyl-2-hydroxybenzoic acid.
9. The normal thiamin salt of 5-cyclohexyl-3-methyl-2-hydroxybenzoic acid.
10. The normal thiamin salt of 3-phenyl-2-hydroxybenzoic acid.
11. The normal thiamin salt of 5-phenyl-2-hydroxybenzoic acid.
12. The normal thiamin salt of 1-hydroxy-2-naphthoic acid.

13. Process for the production of difficultly soluble salts of thiamin that comprises reacting a relatively soluble salt of thiamin in an aqueous reaction medium adjusted to a pH value within the range pH 5.0–7.0, with a salt of a substituted hydroxybenzoic acid of the formulation;

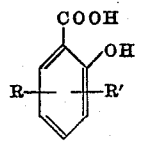

wherein R is a member selected from the group consisting of the aliphatic and aromatic radicals isopropyl, isobutyl, isohexyl, isoheptyl, isooctyl, cyclohexyl, phenyl and phenylene; and R' is a member selected from the group consisting of hydrogen and methyl; and recovering a crystallized, difficultly soluble thiamin salt of the acid from the reaction medium.

References Cited in the file of this patent

FOREIGN PATENTS 740,950     Great Britain _____ Nov. 23, 1955